United States Patent [19]

Kruckemeyer et al.

[11] Patent Number: 5,706,919
[45] Date of Patent: Jan. 13, 1998

[54] ALTERNATING STATE PRESSURE REGULATION VALVED DAMPER

[75] Inventors: William Charles Kruckemeyer, Beavercreek; Richard Edward Longhouse, Dayton; Patrick Neil Hopkins, Miamisburg; Michael Leslie Oliver, Xenia; Michael Anthony Dimatteo, Kettering, all of Ohio

[73] Assignee: General Motors Corporation, Detroit, Mich.

[21] Appl. No.: 687,863

[22] Filed: Jul. 29, 1996

[51] Int. Cl.$^6$ ............................................. F10F 9/46
[52] U.S. Cl. .................. 188/299; 188/282; 188/322.15; 280/707
[58] Field of Search .................. 188/280, 281, 188/282, 322.15, 299, 319; 280/707, 714

[56] References Cited

U.S. PATENT DOCUMENTS

| | | | |
|---|---|---|---|
| 5,139,119 | 8/1992 | Karnopp | 188/299 |
| 5,277,283 | 1/1994 | Yamaoka et al. | 188/282 X |
| 5,307,907 | 5/1994 | Nakamura et al. | 188/282 |
| 5,409,088 | 4/1995 | Sonsterod | 188/299 |
| 5,647,461 | 7/1997 | Jensen et al. | 188/322.15 |

FOREIGN PATENT DOCUMENTS 2164723  9/1985  United Kingdom.

*Primary Examiner*—Lee W. Young
*Attorney, Agent, or Firm*—Jeffrey A. Sedlar

[57] ABSTRACT

A damper includes a piston that carries a relatively compact control valve for controlling fluid flow through the piston. The control valve provides a variable amount of damping by regulating damper fluid flow between the extension chamber and the compression chamber of the damper during extension and compression strokes. Pressure regulation across the piston is controlled through two alternate flow paths as determined by the control valve. Damping through the first flow path is relatively soft and is determined according to the deflective characteristics of a single bi-directional annular disc valve. Damping through the second flow path is relatively firm and is determined by the first bi-directional single annular disc and a second bi-directional single annular disc in series.

11 Claims, 3 Drawing Sheets

5,706,919

ALTERNATING STATE PRESSURE REGULATION VALVED DAMPER

BACKGROUND OF THE INVENTION

The present invention relates to an alternating state pressure regulation valved damper and more particularly, to a damper with an electrically controlled alternating pressure regulation valve assembly which provides variable damping rates for a vibration damper through individual or multiple passive valves.

Conventional vehicle suspension dampers typically consist of direct double-acting telescopic hydraulic passive dampers. They are generally described as either shock absorbers or struts. A primary purpose of shock absorbers is to dampen oscillations of the vehicle suspension spring. This is accomplished by converting kinetic energy in the form of motion between sprung and unsprung masses of a vehicle into heat and then dissipating the heat. Struts also serve this capacity and in addition, support reaction and side-load forces on the suspension.

Typical dampers are hydraulic devices using oil as the medium for converting motion into heat. As the damper is cycled a piston is forced to move in extension and compression directions through the oil that is contained within a cylinder tube. This creates pressure within a portion of the cylinder tube and a consequent pressure drop across the piston. During an extension stroke, high pressure is created in the extension chamber of the cylinder tube above the piston, forcing oil to flow through the valving of the piston. During a compression stroke, high pressure is created in the compression chamber of the cylinder tube below the piston, forcing oil to flow back through the piston's valving. As the piston moves an additional amount of oil substantially equal to the volume of the piston rod entering or exiting the cylinder tube is forced through the piston valving or through a valve at the base of the cylinder tube in combination with the piston valving in compensation.

As oil is forced to flow through the orifices in the piston valve and/or the base valve a pressure drop is effected and the oil is heated. Through this mechanism dampers dissipate energy stored by the vehicle's suspension springs. The extent to which the oil is heated and consequently, the amount of energy dissipated is controlled by the size of the orifices in the valving and the amount of flow forced through the valving.

Damping force is a common measurement of the performance of a damper. It is used to quantify the amount of spring control provided by a damper. Passive dampers are tuned to provide selected vehicle performance characteristics. Because passive dampers provide a set damping force they are generally somewhat of a compromise in providing optimum damping performance over a wide range of operating conditions.

The concept of dampers with an electrically controlled damping rate has been developed in the art wherein an algorithm is used to provide a control mechanism as a means of varying the damping force provided by a damper. This is typically achieved by varying the valving orifices in response to various sensors which are used to detect current real world operating conditions. Such dampers adjust the damping force in response to the control mechanism so that various performance characteristics can be provided by an individual damper. A controllable orifice however, provides less than ideal levels of control at low flow rates.

Electrically controlled hydraulic dampers for vehicle suspensions have, in principle, been known in the art for some time. However, their actual application and use have been somewhat of a recent phenomenon. A known type of adjustable damper which includes a control valve positioned near the piston carries components of the control valve within the piston rod. This necessitates a piston rod of a relatively large diameter. Additional volume required to accommodate the displacement resulting from a large diameter rod unpreferably increases the overall size of the damper and detracts from the active length of the assembly. Another type of known adjustable damper carries the control valve outside the cylinder tube. This type of design necessitates consideration of the externally carried valve when packaging the damper within the suspension system.

SUMMARY OF THE INVENTION

It is an aspect of the present invention to provide a damper with an acceptable active length that provides effective variable damping fluid flow control in a monotube design. This is accomplished through an alternating state pressure regulation valved damper piston. A monotube damper in accordance with this aspect includes a cylinder slidably carrying a piston which separates the cylinder into extension and compression chambers. The piston carries a relatively compact control valve for controlling fluid flow through the piston. The control valve provides a variable amount of damping by regulating damper fluid flow between the extension chamber and the compression chamber of the damper during extension and compression strokes. Pressure regulation across the piston is controlled through two alternate flow paths as determined by the control valve.

A first bi-directional, deflectable, single annular disc passive damping valve mechanism is positioned on the piston between the extension and compression chambers. The first passive damping valve provides pressure regulation across the piston during both extension and compression strokes during all operation of the damper. A second bi-directional, deflectable, single annular disc passive damping valve mechanism is positioned on the piston between the extension and compression chambers. The second passive damping valve selectively provides alternate pressure regulation across the piston in series with the first passive damping valve during both extension and compression strokes.

The control valve includes a movable element responsive to a control mechanism. The flow passage through the piston includes a first branch that communicates through ports in the control valve, and flow therethrough is alternately interrupted or permitted as determined by the control mechanism. When flow through the first branch is permitted by the control valve, the flow passage through the piston extends through the first passive valve and the control valve. When flow through the first branch is interrupted by the control valve, the flow passage through the piston extends through the first passive valve and a second branch that includes the second passive valve in series with the first passive valve.

Advantages of the present invention include internal packaging of the control valve which utilizes less space than externally packaged designs that carry the control valve outside the cylinder tube or designs that carry components of the control valve within the piston rod. Additionally, the active length of the damper is maximized.

DETAILED DESCRIPTION OF THE PRESENTLY PREFERRED EMBODIMENT

Figure 1:
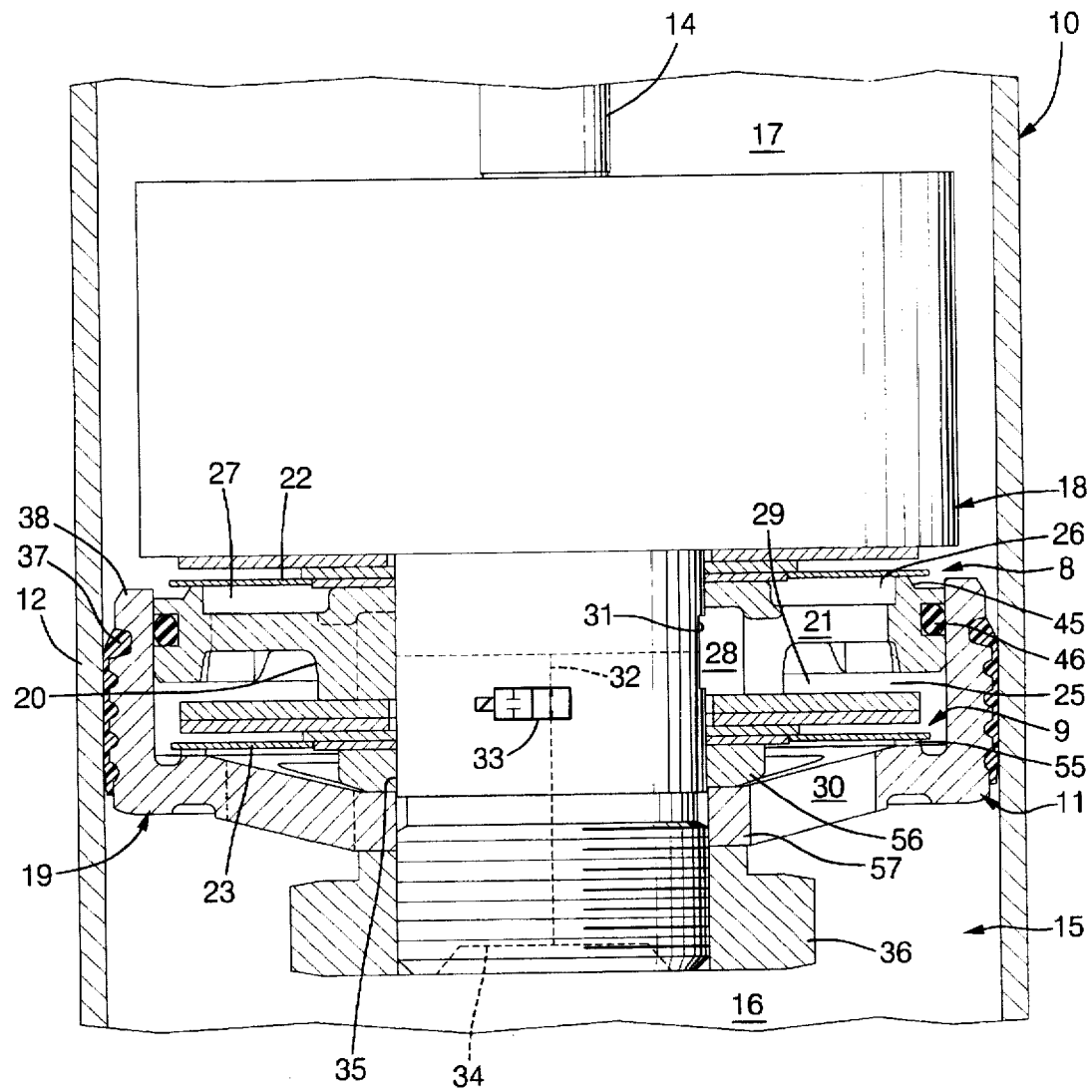
FIG. 1 is a fragmentary cross sectional view of an alternating state pressure regulation valved monotube damper.

Referring to the drawings, illustrated in FIG. 1 is an alternating state pressure regulation valved monotube suspension damper embodied as shock absorber 10. Shock absorber 10 includes a single tube designated as cylinder 12. Cylinder 12 has a closed lower end (not illustrated), and an upper end closed by a rod guide (not illustrated) in a conventional manner defining cylindrical cavity 15. Cavity 15 is divided into extension chamber 17 and compression chamber 16 by a piston assembly 11. Piston assembly 11 is sealingly disposed in cylinder 12 for slidable axial movement therein.

Securely connected to piston assembly 11 by a conventional means is piston rod 14 which extends through extension chamber 17 of cylinder tube 12 exiting the cavity 15 through the rod guide. The upper end of the piston rod 14 is adapted for connection to the sprung mass (body), of the motor vehicle (not illustrated), in a conventional manner. A similar means of attachment is provided at the lower end (not illustrated), of cylinder 12 for connection to the unsprung mass (wheel assembly), of the vehicle in a conventional manner. Relative movement between the sprung and unsprung masses of the vehicle, to which shock absorber 10 is connectable, produces relative axial sliding movement of the piston assembly 11 within the cylinder 12.

The piston assembly 11 includes a control valve 18 that is carried on the bottom of the rod 14 and is connected therewith through a conventional means. A piston cup 19 is received on the cylindrical body 35 of control valve 18 and is fixed thereon by a threaded nut 36. The piston cup 19 includes a seal ring 37 made of low friction material. Seal ring 37 sealingly bears against the cylinder 12 providing fluid separation between the compression chamber 16 and the extension chamber 17.

The piston cup 19 spans between the cylindrical body 35 of control valve 18 and the cylinder 12 opening at its top to the extension chamber 17 within the rim 38. Piston cup 19 is provided with a plurality of openings 30 which open the interior of the piston cup 19 to the compression chamber 16. Therefore, a flow passage 26 is provided through the piston assembly 11 between the compression chamber 16 and the extension chamber 17. The flow passage 26 is normally closed by the passive valve assemblies 8 and 9.

More specifically, a valve plate 20 is positioned within the piston cup 19 and supports a bi-directional, deflectable, single annular valve disc 22. A second bi-directional, deflectable, single annular valve disc 23 is supported by the piston cup 19. A control valve 33 is carried within the control valve assembly 18 and operates to selectively open and close a flow path between the openings 31 and 34 through the control valve assembly 18. Accordingly, during compression or extension travel of the piston assembly 11 within the cylinder 12 fluid flow between the extension chamber 17 and the compression chamber 16 can be through either of two branches 32 and 25 through a flow passage 26 across the piston assembly 11.

When the control valve 33 is in the open position as shown, fluid flow travels through the passive valve assembly 8, deflecting disc 22 and through the control valve 33 providing one level of damping through branch 32. This effects a first pressure drop for fluid travel across the piston assembly 11 providing a first degree of pressure regulation for a first state of operation of the shock absorber 10. When the control valve 33 is moved to its closed position, fluid flow between the extension chamber 17 and the compression chamber 16 travels through passive valve assemblies 8 and 9, deflecting disc 22 and disc 23 providing another level of damping through branch 25. This effects a second pressure drop for fluid travel across the piston assembly 11 providing a second degree of pressure regulation for a second state of operation of the shock absorber 10.

Figure 2:
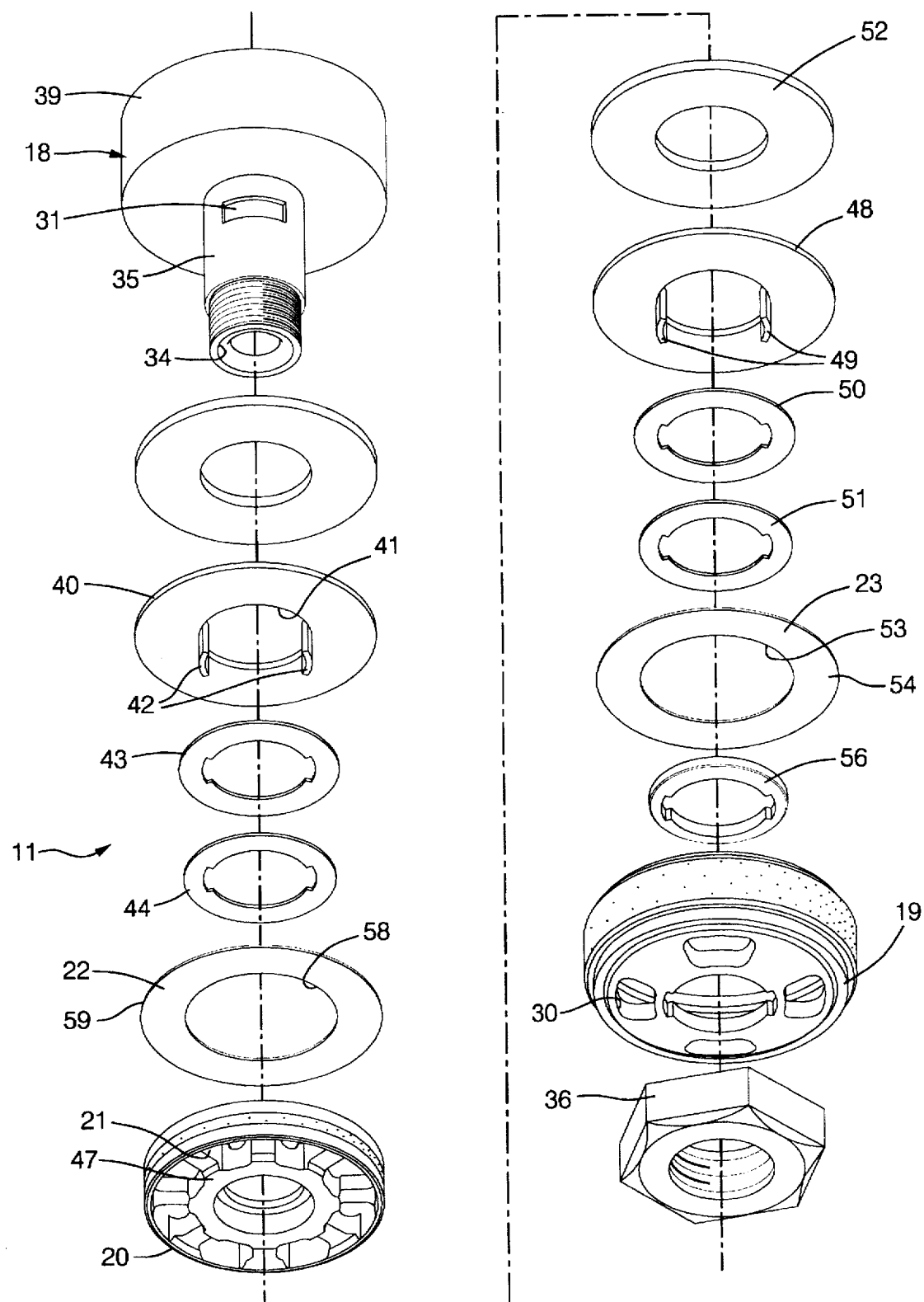
FIG. 2 is a perspective exploded view of the piston assembly of the damper of FIG. 1.

For more specificity, additional reference is directed to FIG. 2, along with FIG. 1. The control valve assembly 18 includes solenoid housing 39 and cylindrical body 35. A flow path is effected through the control valve assembly 18 between the openings 31 provided in the side of cylindrical body 35 and the opening 34 provided in the end of cylindrical body 35 at the bottom of piston assembly 11. The control valve 33 is active during operation of the shock absorber 10, in-that, it is selectively positioned so that an open or closed flow path is provided between the openings 31 and 34. The opening and closing of control valve 33 is effected in a rapid and repeating manner in real time response to vehicle operating conditions via electronic control in a conventionally known manner or in response to manual selection when preferred.

The piston cup 19 is received on the cylindrical body 35 of the control valve assembly 18 and fixed thereon by the nut 36 thereby carrying the various passive valving components of the piston assembly 11. Valve assemblies 8 and 9 of the piston assembly 11 are passive, in-that they respond only by deflection upon the presence of fluid pressure differentials at various stages across the piston assembly 11.

Valve assembly 8 includes an indexing spacer 40. Indexing spacer 40 has an opening 41 and is received over the cylindrical body 35 of control valve assembly 18 against the solenoid housing 39 with an optional stop plate (no reference numeral), that is annular in shape, positioned between the solenoid housing 39 and the indexing spacer 40. The indexing spacer 40 is so called because it includes a pair of legs 42 which operate to provide proper orientation of a support disc 43 and a centering disc 44. The support disc 43 and centering disc 44 each include corresponding notches for receipt over the legs 42. The support disc 43 is positioned adjacent the indexing spacer 40 and the center disc 44 is positioned adjacent the support disc 43 as seen in FIG. 1.

The valve plate 20 similarly includes notches corresponding to the legs 42 and is positioned over the cylindrical body 35 of control valve assembly 18 such that the annular groove 27, seen in FIG. 1, spans radially across a portion of the center disc 44 and the valve disc 22. The valve disc 22 is held in a centered position by the center disc 44 and is biased between the outer periphery of the support disc 43 which engages the top of inner periphery 58 of valve disc 22 and the annular leg 45 of the valve plate 20 which engages the bottom of outer periphery 59 of valve disc 22. The valve plate 20 carries a seal 46 that bears against the inside surface of piston cup 19 and includes a number of openings 21 distributed in an annular configuration around the valve plate 20 providing fluid flow paths therethrough that are normally closed by the valve disc 22. The valve plate 20 also includes a number of downwardly directed legs that come together at ring 47.

An annular stop plate 52 is positioned over the cylindrical body 35 of control valve assembly 18 engaging the ring 47 of valve plate 20 providing support therefor. A second passive valve assembly 9 including indexing spacer 48 with legs 49, support disc 50, center disc 51 and valve disc 23 is received over the cylindrical body 35 of control valve 18 adjacent the stop plate 52. The valve disc 23 is supported at the top of inner periphery 53 by the support disc 50 and at the bottom of outer periphery 54 by annular ledge 55 of piston cup 19. A main spacer 56 is positioned against center disc 51 bearing against the annular leg 57 of piston cup 19 with a nut 36 applying a fixed bias to the annular leg 57 maintaining the piston cup 19, the first and second valve assemblies 8, 9 and the valve plate 20 in position on the cylindrical extension 35 of control valve assembly 18. The main spacer 56 and piston cup 19 each include a pair of notches similar to the notches found in support disc 50 and center disc 51 for mating engagement with the legs 49 of indexing spacer 48.

The indexing spacers 40 and 48 provide a means of aligning the support discs 43 and 50, the center discs 44 and 51, the main spacer 56 and the valve plate 20 and piston cup 19 in relation to one another in the assembly. The control valve assembly 18 and the valve discs 22 and 23 are designed so that their radial alignment is unimportant to the proper functioning of the alternate valving in the piston assembly 11.

During a compression stroke of the piston assembly 11 when the control valve 33 is in an open position, fluid flow is permitted through opening 34 in the bottom of cylindrical extension 35 of control valve assembly 18. Fluid passes through the control valve 33, the branch 32 and the openings 31 to the annular space 28 outside the cylindrical extension 35. This defines part of the flow passage 26 through the piston assembly 11. From the annular space 28 fluid flows through the openings 21 in the valve plate 20 into the annular groove 27 applying pressure to the valve disc 22 which, in relation to the pressure applied thereto, deflects at its outer periphery 59 with the inner periphery 58 remaining supported on the support disc 43.

Deflection of the valve disc 22 opens a flow passage between the outer periphery 59 thereof, and annular leg 45 of valve plate 20, permitting fluid flow through the piston assembly 11 from the compression chamber 16 to the extension chamber 17 with the valve assembly 9 remaining closed. The valve disc 22 effects a pressure drops as the fluid flows through the piston assembly 11 which results in a damping effect for the travel of piston assembly 11 within cylinder 12.

Figure 3:
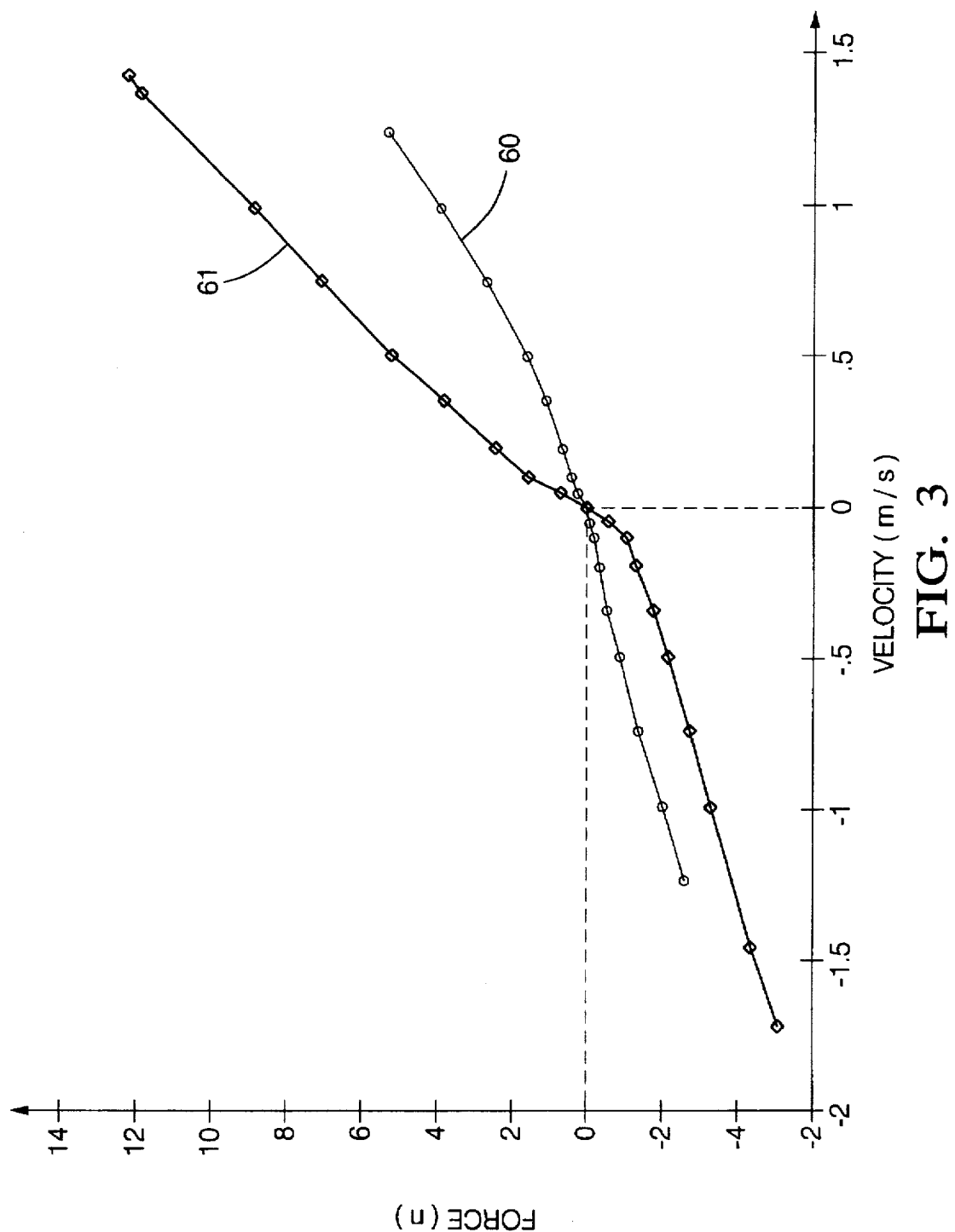
FIG. 3 is a performance curve showing force graphed on the abscissa and velocity graphed on the ordinate for the damper of FIG. 1 including both alternate pressure regulation state functions.

The damping effect produced by passive valve assembly 8 and control valve 33 through branch 24 of fluid passage 26 during a compression stroke is shown in FIG. 3 and is graphed in the quadrant defined by the positive abscissa and ordinate by curve 60. Curve 60 demonstrates the performance of the piston assembly 11 showing the damping force produced for a given velocity of travel through cylinder 12. The valve disc 22 is designed such that the damping effect it produces is significantly less than that produced by the valve disc 23 and therefore, when the control valve 33 is open, the valve disc 23 remains seated against the annular leg 55 and support disc 50 closing off branch 25 of the flow passage through the piston assembly 11.

With the branch 25 remaining closed during movement of the piston assembly 11 in an extension stroke within the cylinder 12, the inner periphery 58 of the valve disc 22 is caused to deflect downward off the support disc 43. This opens a flow path from the extension chamber 17 into the annular groove 27, permitting fluid flow through the branch 24 of the flow passage 26 through the piston assembly 11 which extends through the open control valve 33 to the compression chamber 16. The valve disc 22 effects damping as a result of the pressure drop effected thereacross which is demonstrated by curve 60 of FIG. 3 graphed in the quadrant defined by the negative abscissa and ordinate. This demonstrates the damping performance of the piston assembly 11 during an extension stroke showing the resultant force developed during travel of the piston assembly 11 within cylinder 12 for a given velocity.

When the control valve 33 is closed, the flow path through the branch 24 of the passage 26 through the piston assembly 11 is closed. Therefore, during compression and extension strokes of the piston assembly 11 within the cylinder 12, fluid must flow through the branch 25. During a compression stroke of the piston assembly 11, when the control valve 33 is closed, a fluid pressure effected in compression chamber 16 is communicated through the openings 30 of piston cup 19 and applied to the valve disc 23. When a sufficient fluid pressure is effected, the outer periphery 54 of valve disc 23 is deflected upward off the annular ledge 55 of piston cup 19 opening a flow passage to the L-shaped annular space 29 for the branch 25 of flow passage 26. The control valve 23 is supported at its inner periphery on the support disc 50.

Within the piston assembly 11, the fluid pressure is transmitted to the L-shaped annular space 29 and is communicated through the openings 21 of valve plate 20 to the annular groove 27 and applied to the valve disc 22. When the pressure is sufficient, the outer periphery 59 of the valve disc 22 is caused to deflect upward with the inner periphery 58 remaining supported on support disc 43 and opening a flow passage between the annular leg 45 of valve plate 20 and the valve disc 22 into the extension chamber 17. Therefore, fluid is permitted to flow from the compression chamber 16 through the branch 25 of flow passage 26 deflecting both the valve disc 23 and valve disc 22 in series. This results in a two-stage pressure drop for fluid flow through the passage 26 across the piston assembly 11 and is graphed in FIG. 3 as curve 61 for compression travel in the quadrant defined by the negative abscissa and ordinate. The performance curve 61 demonstrates that for a given velocity of the piston assembly 11 a significantly greater force is developed during the damping operation of the shock absorber 10 as compared to the performance demonstrated by curve 60 as effected through the control valve 33 and single valve disc 22.

During a rebound stroke of the piston assembly 11 within the cylinder 12 with the control valve 33 closed, a pressure increase effected in rebound chamber 17 is applied to the valve disc 22 causing the inner periphery 58 to deflect downward with the outer periphery 59 remaining supported on the annular leg 45 and opening a flow path to the annular groove 27. Fluid passing the deflected valve disc 22 travels through the openings 21 in the valve plate 20 to the L-shaped annular space 29. This flow travels through branch 25 of flow passage 26 and is applied to the valve disc 23. When the fluid pressure is sufficient, the inner periphery 53 of valve disc 23 is deflected downward off the support disc 50 with the outer periphery 54 remaining supported on the annular ledge 55 opening a flow path through the openings 30 to the compression chamber 16.

As fluid flows through the branch 25 of passage 26 through the piston assembly 11 deflecting both valve discs 22 and 23 in series a two-stage pressure drop occurs which effects the damping performance graphed as curve 61 of FIG. 3 in the quadrant defined by the positive abscissa and ordinate. As is demonstrated by FIG. 3, the developed damping force resulting from a given velocity for the travel of piston assembly 11 within the cylinder 12 is significantly greater for the curve 61 which graphs the series combination of valve discs 22 and 23 and for the curve 60 which graphs the combination of a single valve disc 22 and control valve 33.

As shown in FIG. 3, the damping rate during extension travel of the piston 11 is of a greater magnitude than when the piston 11 travels in the compression direction. This is demonstrated by both curve 60 and curve 61. This provides desirable performance characteristics for the shock absorber 10.

Through means of the foregoing structure a compact manner of regulating pressure by controlling the pressure drop as fluid flows from one side of the piston assembly 11 to the other is provided. The pressure drop is modified by an electrical signal communicated to the control valve assembly 18, moving the control valve 33 between open and close positions. This selectively alternates the relative damping force between the body and wheel of a vehicle to which the shock absorber 10 is assembled through the piston assembly 11. Since the control valve 18 is carried with the piston assembly 11 instead of within the rod 14, the rod diameter can remain relatively small for a damper with an internal electrically variable valve. The relatively small rod size minimizes the amount of volume metric compensation required for fluid displacement resulting in reduced overall size requirement of the piston assembly 11 within the shock absorber 10. This tends to maximize the applications within which the shock absorber 10 can be utilized by maximizing active length. The flow path through the deflectable disc valve assembly 8, or valve assemblies 8, 9, of the piston assembly 11, remains relatively direct for both alternate states of the pressure regulation valve scheme.

What is claimed is:

1. A suspension damper comprising:

a single cylinder defining a substantially liquid filled cavity;

a piston slidably positioned in the single cylinder separating the cavity into a compression chamber and an extension chamber;

a rod attached to the piston and extending through the extension chamber and exiting the cavity;

wherein the piston is slidable in a compression direction such that an increasing volume of the rod enters the cavity and in an extension direction such that an increasing volume of the rod exits the cavity wherein a passage is provided through the piston so that a liquid exchange is effected between the extension chamber and the compression chamber during sliding of the piston in the extension and compression directions;

wherein the passage has a first branch and a second branch, the liquid exchange being selectively effected through the first branch that includes a bi-directional deflectable first single annular disc tuned to effect a relatively soft damping rate, the first single annular disc controlling damping forces at all flow rates in both directions during extension direction and compression direction travel of the piston and the first branch also including a remotely operated control valve being selectively positioned in a first open position substantially freely allowing liquid exchange through the first branch and a second closed position substantially preventing liquid exchange through the first branch, and the liquid exchange being selectively effected through the second branch that includes the bi-directional deflectable first single annular disc tuned to effect a soft damping rate and a bi-directional deflectable second single annular disc tuned to effect a firm damping rate wherein when the remotely operated control valve is in the first open position the monotube suspension damper develops a first damping rate wherein force is dependent upon velocity of the sliding piston and the first damping rate is substantially determined by deflective characteristics solely of the first single annular disc and when the remotely operated control valve is in the second closed position the monotube suspension damper develops a second damping rate wherein force is dependent upon velocity of the sliding piston and the second damping rate is substantially determined by deflective characteristics of the first single annular disc and the second single annular disc in series.

2. A suspension damper according to claim 1 wherein the first damping rate and the second damping rate are both generally substantially greater when the piston slides in the extension direction then when the piston slides in the compression direction.

3. A suspension damper according to claim 1 wherein the remotely operated control valve is connected to the rod, the remotely operated control valve including a disk shaped solenoid housing and a cylindrical body extending from the solenoid housing and terminating at a lower end, wherein the piston includes a piston cup with an annular wall with openings, the piston cup received over the cylindrical extension and spanning across the single cylinder and the piston cup sealingly bearing against the single cylinder with a rim of the piston cup forming an opening inside the piston cup that is open to the extension chamber, the lower end of the cylindrical body having a single opening that opens to the compression chamber and the cylindrical body having a side opening open to the inside of the piston cup.

4. A suspension damper according to claim 3 wherein the piston includes a first indexing spacer with at least one leg positioned over the cylindrical body and a first centering disc positioned over the cylindrical body the first centering disc having a notch that receives the leg of the first indexing spacer wherein the first single annular disc is positioned around the first centering disc and is oriented between the solenoid housing and the side opening of the cylindrical body, and, wherein the piston includes a second indexing spacer with at least one leg positioned over the cylindrical body and a second centering disc positioned over the cylindrical body the second centering disc having a notch that receives the leg of the second indexing spacer wherein the second single annular disc is positioned around the second centering disc and is oriented between the side opening of the cylindrical body and the single opening in the end of the cylindrical body.

5. A suspension damper according to claim 4 wherein the piston includes a valve plate having a plurality of radially disposed openings, the valve plate positioned over the cylindrical body between the first single annular disc and the second single annular disc.

6. A suspension damper according to claim 5 wherein the valve plate includes an annular leg, the first single annular disc normally bearing against the annular leg and closing the plurality of radially disposed openings of the valve plate.

7. A suspension damper according to claim 6 wherein the piston cup includes an annular ledge, the second single annular disc normally bearing against the annular ledge and closing the openings of the annular wall of the piston cup.

8. A suspension damper according to claim 7 wherein the first single annular disc includes an outer periphery that is biased against the annular leg of the valve plate and the second single annular disc includes an outer periphery that is biased against the annular ledge of the piston cup wherein when the remotely operated control valve is open and when the piston slides in the compression direction, the outer periphery of the first single annular disc deflects off the annular leg of the valve plate and the outer periphery of the second single annular disc remains seated on the annular ledge of the piston cup effecting the first damping rate, and when the remotely operated control valve is closed and when the piston slides in the compression direction, the outer periphery of the first single annular disc deflects off the annular leg of the valve plate and the outer periphery of the second single annular disc deflects off the annular ledge of the piston cup effecting the second damping rate.

9. A monotube suspension damper comprising:

a cylinder slidably carrying a piston separating the cylinder into an extension chamber and a compression chamber, the piston carrying a control valve for controlling fluid flow through the piston, the control valve providing a variable amount of damping by regulating damper fluid flow between the extension chamber and the compression chamber of the damper during extension and compression strokes of the piston wherein a pressure regulation across the piston between the extension chamber and the compression chamber is controlled through alternate first and second flow paths as determined by the control valve;

a bi-directional, deflectable, first single annular disc positioned on the piston between the extension and compression chambers, the first single annular disc providing the pressure regulation across the piston during both the extension and compression strokes during operation of the damper when the control valve is open;

a bi-directional, deflectable, second single annular disc positioned on the piston between the extension and compression chambers, the second single annular disc in series with the first single annular disc selectively providing the pressure regulation across the piston during both the extension and compression strokes during operation of the damper when the control valve is closed.

10. A monotube suspension damper according to claim 9 wherein when the control valve is open the pressure regulation effects a first damping rate and when the control valve is closed the pressure regulation effects a second damping rate, the second damping rate being significantly greater than the first damping rate and both the first and the second damping rates being of a greater magnitude when the piston moves in the extension direction than when the piston moves in the compression direction.

11. A suspension damper comprising:

a cylinder defining a substantially liquid filled cavity;

a piston slidably positioned in the cylinder separating the cavity into a compression chamber and an extension chamber;

a rod attached to the piston and extending through the extension chamber and exiting the cavity;

wherein the piston includes a remotely operated control valve having a solenoid housing and a cylindrical body;

a first indexing spacer having a first leg and positioned over the cylindrical body near the solenoid housing;

a first support disc having a notch receiving the first leg and positioned over the cylindrical body against the first indexing spacer;

a first centering disc having a notch receiving the first leg and positioned over the cylindrical body against the first support disc;

a bi-directional, deflectable first single annular disc positioned around the first centering disc, the first single annular disc having an outer periphery;

a valve plate positioned on the cylindrical body against the first centering disc and supporting the outer periphery of the first single annular disc;

a second indexing spacer having a second leg and positioned over the cylindrical body near the valve plate;

a second support disc having a notch receiving the second leg and positioned over the cylindrical body against the second indexing spacer;

a second centering disc having a notch receiving the second leg and positioned over the cylindrical body against the second support disc;

a bi-directional, deflectable second single annular disc positioned around the second centering disc, the second single annular disc having an outer periphery;

a piston cup fixed on the cylindrical body near the second centering disc and supporting the outer periphery of the second single annular disc;

wherein the piston is slidable in a compression direction such that an increasing volume of the rod enters the cavity and in an extension direction such that an increasing volume of the rod exits the cavity wherein a passage is provided through the piston so that a liquid exchange is effected between the extension chamber and the compression chamber during sliding of the piston in the extension and compression directions;

wherein the passage has a first branch and a second branch, the liquid exchange being selectively effected through the first branch that includes the first single annular disc tuned to effect a relatively soft damping rate the first single annular disc controlling damping forces at all flow rates in both directions during extension direction and compression direction travel of the piston and the first branch also including the control valve, the control valve being selectively positioned in a first open position substantially freely allowing liquid exchange through the first branch and in a second closed position substantially preventing liquid exchange through the first branch, and the liquid exchange being selectively effected through the second branch that includes the first single annular disc tuned to effect a soft damping rate and the second single annular disc tuned to effect a firm damping rate wherein when the remotely operated control valve is in the first open position the monotube suspension damper develops a first damping rate wherein force is dependent upon velocity of the sliding piston and the first damping rate is substantially determined by deflective characteristics solely of the first single annular disc and when the remotely operated control valve is in the second closed position the monotube suspension damper develops a second damping rate wherein force is dependent upon velocity of the sliding piston and the second damping rate is substantially determined by deflective characteristics of the first single annular disc and the second single annular disc in series.

* * * * *